(12) United States Patent
Assarpour

(10) Patent No.: US 8,619,605 B2
(45) Date of Patent: Dec. 31, 2013

(54) METHOD AND APPARATUS FOR MAINTAINING PORT STATE TABLES IN A FORWARDING PLANE OF A NETWORK ELEMENT

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 874 days.

(21) Appl. No.: 12/772,457

(22) Filed: May 3, 2010

(65) Prior Publication Data

US 2010/0293200 A1 Nov. 18, 2010

Related U.S. Application Data

(60) Provisional application No. 61/178,020, filed on May 13, 2009.

(51) Int. Cl.
*H04L 12/28* (2006.01)
*H04J 1/16* (2006.01)

(52) U.S. Cl.
USPC ........... 370/252; 370/412; 370/419; 370/463; 370/242

(58) Field of Classification Search
USPC .................. 370/252, 412, 419, 463, 242
See application file for complete search history.

(56) References Cited

U.S. PATENT DOCUMENTS

| 6,535,489 | B1 | 3/2003 | Merchant et al. | |
| 8,189,599 | B2 * | 5/2012 | Sharma et al. | 370/395.5 |
| 2003/0142680 | A1 * | 7/2003 | Oguchi | 370/400 |

FOREIGN PATENT DOCUMENTS

| EP | 1 729 461 A1 | 12/2006 |
| WO | WO 00 72531 A1 | 11/2000 |

OTHER PUBLICATIONS

European Search Report dated Sep. 10, 2010.

\* cited by examiner

*Primary Examiner* — John Pezzlo
(74) *Attorney, Agent, or Firm* — Anderson Gorecki & Rouille LLP

(57) ABSTRACT

A method, apparatus and computer program product for maintaining port state tables in a forwarding plane of a network element are presented. The state of a first set of ports associated with a first Forwarding Data Unit (FDU) are periodically determined, the first FDU being one of a plurality of FDUs. The determined state is used to update a first port state table of the port state database associated with the first FDU. The determined state is transmitted to each other FDUs on the network element to enable each of the other FDUs to store the state of the first set of ports in a port state database local to each of the other FDUs. The port state database is used by the forwarding plane to perform fast reroute of packets.

20 Claims, 12 Drawing Sheets

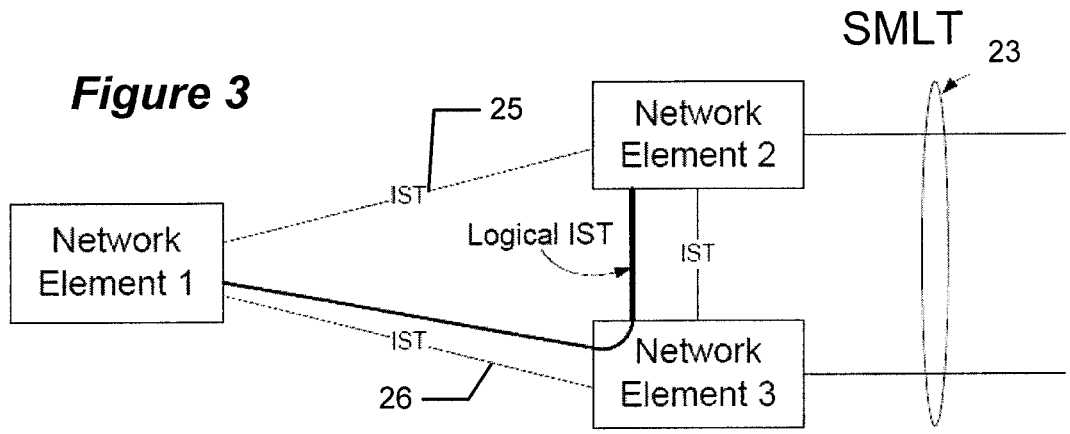
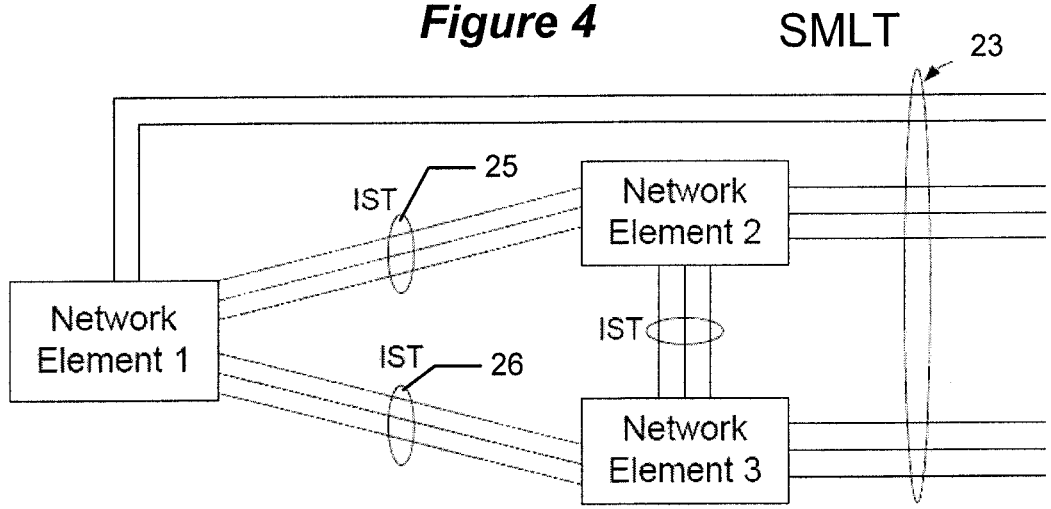

METHOD AND APPARATUS FOR MAINTAINING PORT STATE TABLES IN A FORWARDING PLANE OF A NETWORK ELEMENT

CROSS REFERENCE TO RELATED APPLICATIONS

The present application claims the benefit of U.S. Provisional Patent Application No. 61/178,020, filed on May 13, 2009, which is incorporated herein by reference in its entirety.

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

Network elements are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. To enable the data to be handled quickly, the data plane is typically implemented in hardware so that all of the decisions as to how to handle the data are performed using hardware lookups, etc.

Ports can fail for many reasons, including line card failure, failure of the link connected to the port (e.g. line cut), far-end line card failure, etc. The terms multi-link trunk (MLT), Link Aggregation Group (LAG) and logical ports are synonymous and these terms are used interchangeably. Likewise, the internal forwarding datapath within the network element may fail which may cause a port or set of ports to appear to have failed, or there may be some other failures along the logical/virtual connection to the port's external peer endpoint. There are numerous reasons why a port may fail.

In the event a port fails, traffic destined to the port should be diverted to flow out an alternate port to enable connectivity to be restored through the network. To minimize impact on the traffic being handled by the network element, e.g. to minimize down-time and packet loss, the quicker the rerouting of traffic can occur the better. Preferably, it would be advantageous to enable the traffic to fail over to an alternate port in under ten milliseconds (ms). Preferably, in the case of LAG or MLT, the traffic should be spread across the remaining ports rather than all moved from the failing port to a particular designated alternate port to prevent the designated alternate port from being overloaded with traffic.

SUMMARY

Conventional mechanisms such as those explained above suffer from a variety of deficiencies. One such deficiency is the amount of time taken by conventional network elements to recover from a failure. The longer the amount of time taken to recover the longer the delay in performance (including more dropped packets) as well as the loading of other ports to overcome for the failed port. Current solutions do not provide a comprehensive method to efficiently detect port failures and distribute port states to enable fast reroute during packet/cell/frame forwarding. These solutions typically make extensive use of management and/or control plane software to handle a subset of failures. Their approach results in much longer network down time and higher packet loss.

Embodiments of the invention significantly overcome such deficiencies and provide mechanisms and techniques that provide a method and apparatus for maintaining port state tables in a forwarding plane of a network element. It is very critical to minimize network down time and packet loss, and provide seamless failover in network devices when such failures occur. This invention allows very fast and efficient detection and distribution of the port states within a cluster of nodes. This mechanism enables the fast path to perform seamless fast reroute in the advent of such failures without dynamic assistance from management and/or control plane software.

In a particular embodiment of a method for maintaining port state tables in a forwarding plane of a network element, the method includes periodically determining a state of a first set of ports associated with a first Forwarding Data Unit (FDU), the first FDU being one of a plurality of FDUs implementing forwarding functions within the forwarding plane of the network element. The method further includes using the determined state to update a first port state table of the port state database associated with the first FDU. Additionally, the method includes transmitting the determined state to each other FDUs on the network element to enable each of the other FDUs to store the state of the first set of ports in a port state database local to each of the other FDUs.

Other embodiments include a computer readable medium having computer readable code thereon for maintaining port state tables in a forwarding plane of a network element. The computer readable medium includes instructions for periodically determining a state of a first set of ports associated with a first Forwarding Data Unit (FDU), the first FDU being one of a plurality of FDUs implementing forwarding functions within the forwarding plane of the network element. The computer readable medium further includes instructions for using the determined state to update a first port state table of the port state database associated with the first FDU. Additionally, the computer readable medium includes instructions for transmitting the determined state to each other FDUs on the network element to enable each of the other FDUs to store the state of the first set of ports in a port state database local to each of the other FDUs.

Still other embodiments include a computerized device (network element), configured to process all the method operations disclosed herein as embodiments of the invention. In such embodiments, the computerized device includes a memory system, a processor, communications interface in an interconnection mechanism connecting these components. The memory system is encoded with a process that provides for maintaining port state tables in a forwarding plane of a network element as explained herein that when performed (e.g. when executing) on the processor, operates as explained herein within the computerized device to perform all of the method embodiments and operations explained herein as embodiments of the invention. Thus any computerized device that performs or is programmed maintain port state tables in a forwarding plane of a network element as explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for maintaining port state tables in a forwarding plane of a network element as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a functional block diagram showing another example of organizing a cluster of nodes;

FIG. 4 is a functional block diagram showing another example of organizing a cluster of nodes;

DETAILED DESCRIPTION

Figure 1:
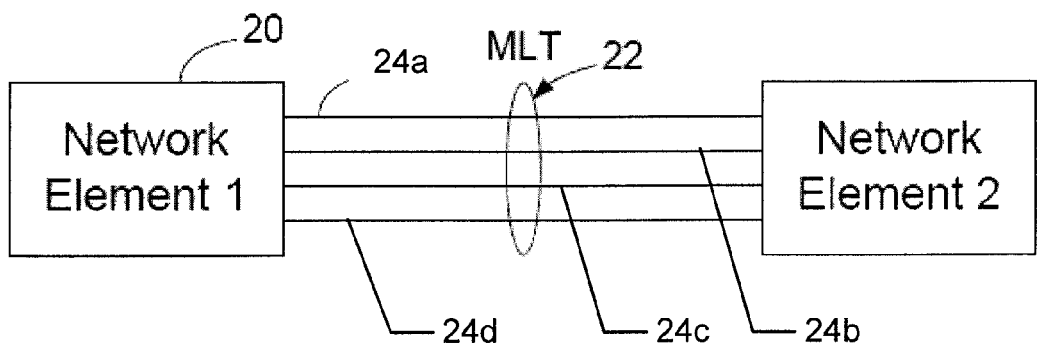
FIG. 1 is a functional block diagram showing a first example of organizing a cluster of nodes.

Over time, the manner in which network elements handle data has evolved. For example, two or more physical links may extend between a group of network elements and be used collectively as a MLT or LAG. FIG. 1 shows an example of two network elements (network element 1 and network element 2) connected by multiple links 24a-d that have been grouped to form a multi-link trunk 22. In particularly, each of the links 24a-d in the MLT 22 may be used by either of the network elements to forward data to the other. Thus, if network element 1 has data (e.g. a frame/packet) to send to network element 2, network element 1 may select one of the links 24a-24d from the MLT 22 and transmit the packet over that link to network element 2.

Figure 2:
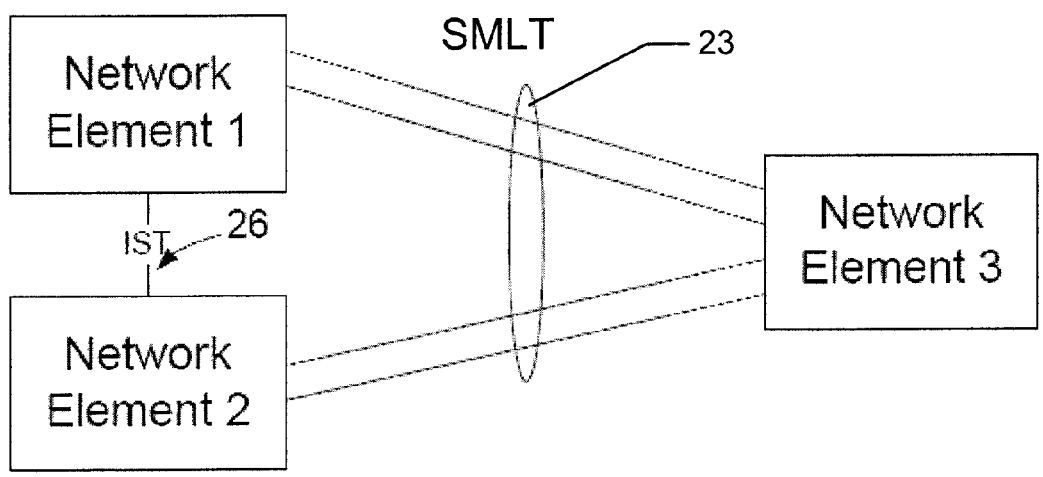
FIG. 2 is a functional block diagram showing another example of organizing a cluster of nodes.

FIG. 2 shows another example way in which network elements may be interconnected. Specifically, in this example network element 1 and network element 2 are interconnected by an inter-switch trunk (IST) 26 which may be a single link or itself may be a multi-link trunk. When the links of a multilink trunk are physically connected to two different network elements, the MLT is called a Split Multi-Link Trunk (SMLT). Network elements 1 and 2 may each have one or more links that connects to network element 3, which may be grouped together to form a SMLT 23. Thus, if network element 1 has data (e.g. a frame/packet) to send to network element 3, network element 1 may either select one of the SMLT links connected to it or may transmit the packet on one of the links associated with the Inter-Switch Trunk 26 to enable the network element 2 to forward the data on one of its links associated with the SMLT to network element 3.

FIG. 3 shows another example in which network element 1 does not have any links connected to the SMLT 23, but is connected by ISTs 25 and 26 to two other network elements (network element 2 and network element 3) that do have ports connected to the links associated with the SMLT. In this scenario, if network element 1 has data to send on the SMLT, it will select one of the IST links (note that each IST link may itself be a SMLT) and forward the data on to either network element 2 or 3. The ISTs may be physical and extend directly between two network elements or may be logical and extend on tunnels through one or more intermediate network elements.

FIG. 4 shows another example in which network element 1 also participates in the SMLT 23. In this instance, if network element 1 has data to send, it may forward the data on one of its links associated with the SMLT 23 or may forward the data on one of the links associated with one of the ISTs 25 or 26 to enable the data to be forwarded on the SMLT 23.

Figure 5:
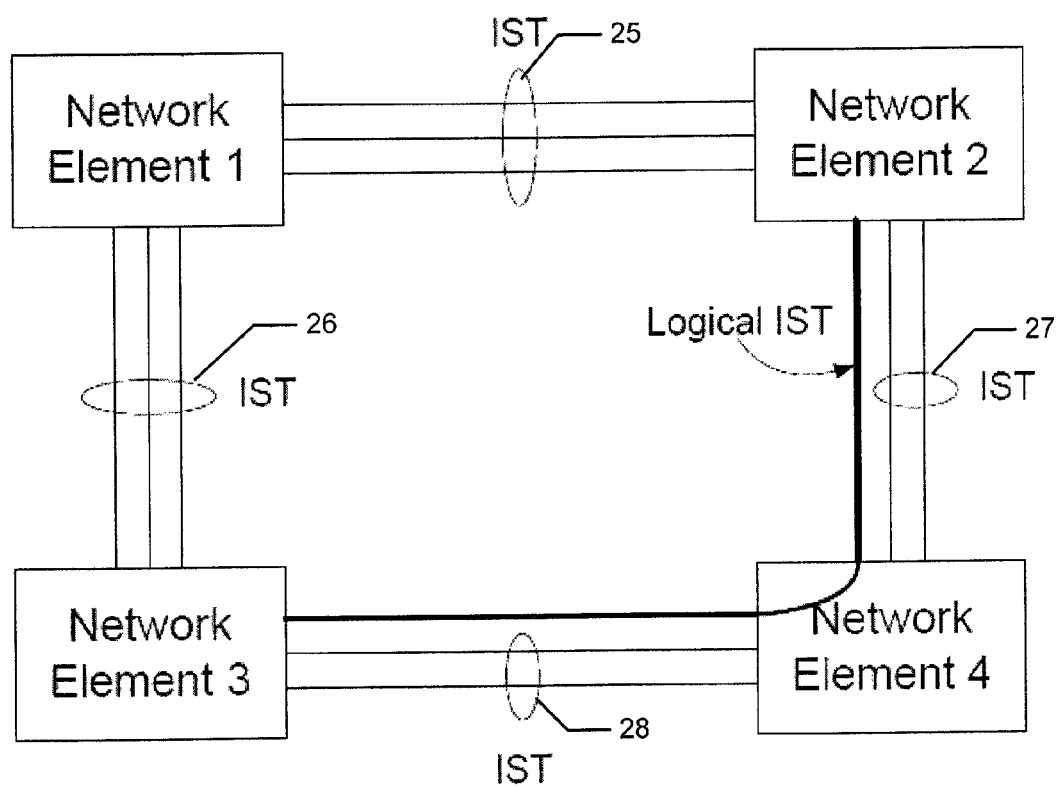
FIG. 5 is a functional block diagram showing another example of organizing a cluster of nodes.
Figure 6:
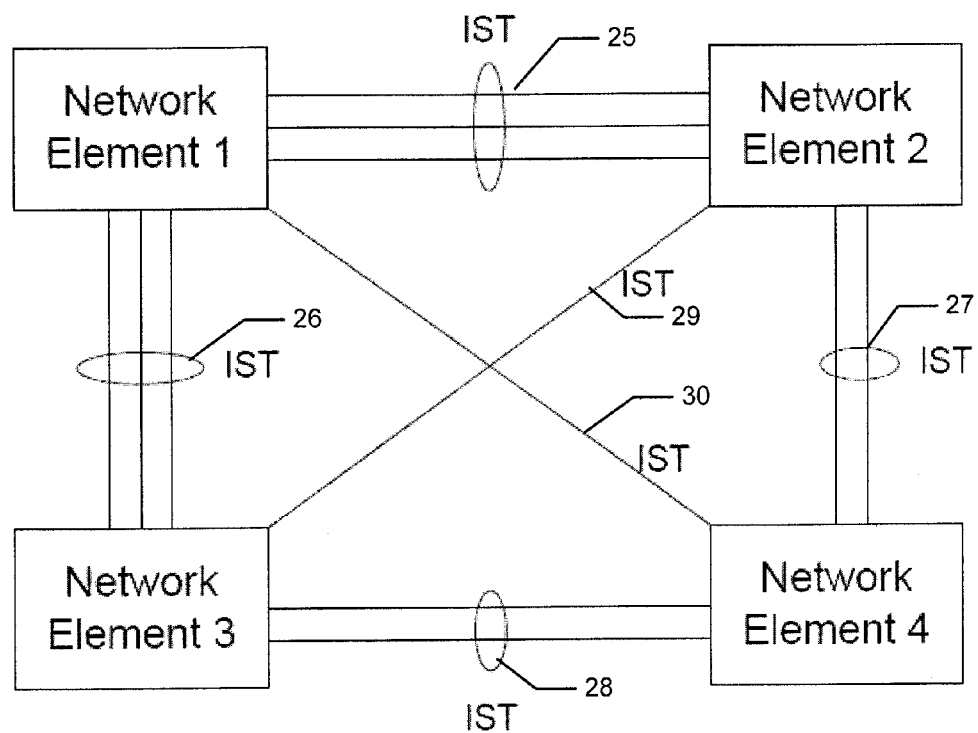
FIG. 6 is a functional block diagram showing another example of organizing a cluster of nodes.

FIGS. 5 and 6 show another way of interconnecting network elements in a square SMLT arrangement. In the arrangement shown in FIG. 5, four network elements are interconnected via ISTs 25-28 in a square arrangement, and in FIG. 6 the four network elements are interconnected via ISTs 25-30 in a meshed arrangement. The ISTs may be physical and extend directly between two network elements or may be logical and extend on tunnels through one or more intermediate network elements.

Although several examples of ways in which network devices may be interconnected have been shown, there are other ways to interconnect a cluster of network elements as well and this example set of interconnection architectures is not intended to be exhaustive. Thus, these examples were merely intended to provide a representative example of a few ways of interconnecting network elements. A group of network elements will be referred to herein as a cluster.

Figure 7:
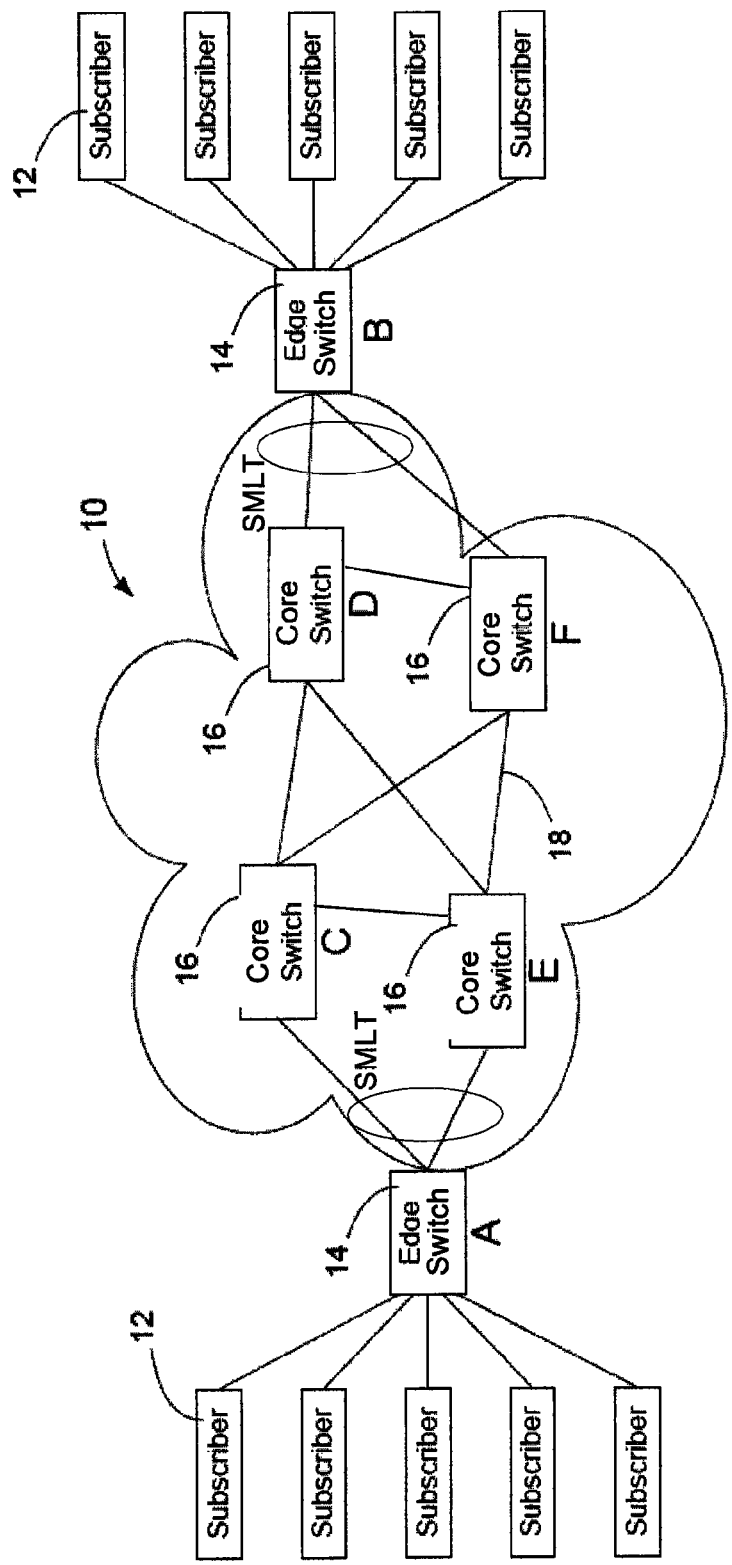
FIG. 7 is a functional block diagram of an example communication network.

FIG. 7 shows an example communication network 10 in which subscribers 12 connect to an edge switch 14. The edge switch 14 connects to core switches 16 which forward data through the network on links 18. Each of these switches may be a physical rouswitchter or may be multiple devices connected together to operate as a cluster. Each of the links 18 may be a MLT or, where the router/switch is implemented as multiple physical devices, may be a SMLT. From a network routing standpoint, there may be multiple ways for a packet to traverse the network. For example, in FIG. 7 the edge switch A may be able to transmit a packet to edge switch B through core switches C and D or, alternatively, may be able to transmit the packet through core switches E and F. A network layer routing protocol may be used to determine the path to be used for transmission of the packet.

As noted above, depending on the manner in which the network elements are interconnected, there may be many ways for the network element to forward a frame/packet to enable the frame/packet to reach its destination. As used herein, the term "cluster" is used to refer to one or more nodes providing node-level resiliency at the network level. Thus, in FIG. 1, network element 1 would be a cluster; in FIG. 2 network elements 1 and 2 would be a cluster, and in FIGS. 3 and 4 network elements 1, 2, and 3 would be a cluster and in FIGS. 5 and 6 network elements 1-4 would be a cluster. As noted above there are other ways of organizing nodes within a cluster.

Logical connections between the cluster nodes are referred to herein as Inter-Switch Trunks (ISTs). ISTs may be physical links that extend from one network element to a neighboring network element in the cluster, or may be logical links that tunnel through one or more intermediate network elements within the cluster. The node that receives a packet from a non-IST port will be referred to as a local node. All other nodes within the cluster are referred to as remote nodes with respect to the received packet. When an IST is selected for use, the IST is selected on a rotational basis. This is done to prevent repeatedly selecting the same IST and is used in place of a hashing function.

Two or more links may be grouped to form a Multi-Link Trunk (MLT). Each MLT will be assigned a MLT group ID (MLT-ID), which is a global value within the cluster and unique across the cluster nodes. An MLT with all its port members only on one node is referred to as a normal MLT group. An MLT group where its port members are on two or more nodes is referred to as a Split MLT or SMLT group.

When a logical port is implemented as a MLT or SMLT, there are actually multiple physical ports that are capable of forwarding a packet to its next hop on the network. Accordingly, if one of the ports of a MLT/SMLT fails, it would be advantageous to cause the packet to be forwarded on one of the remaining ports so that the packet can traverse the network rather than being dropped. Likewise, rather than designate a primary and backup port for each port in the MLT/SMLT, it would be advantageous to load share the packets across the remaining ports of the MLT/SMLT so that the packets may be distributed across the remaining ports that are UP. According to an embodiment, this process is implemented in hardware so that the fastpath (dataplane) can automatically accommodate individual and multiple port failures and automatically redirect packet traffic across the remaining ports in an equitable manner.

Figure 8:
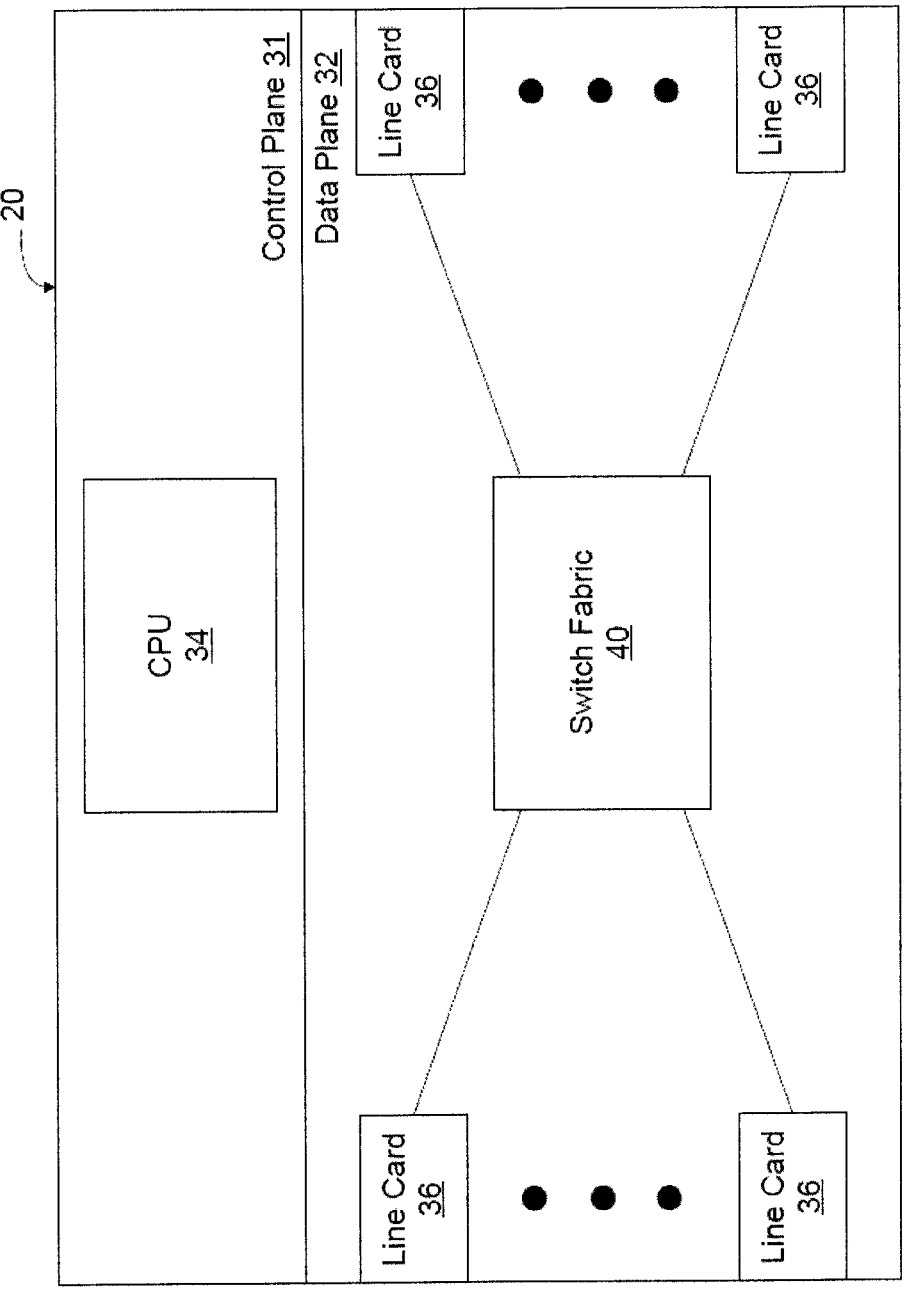
FIG. 8 is a functional block diagram of an example network element.

FIG. 8 shows a functional block diagram of an example network element 20 which may be used as any of the network elements shown in any of FIGS. 1-6. In the example shown in FIG. 8, the network element includes a control plane 31 and a data plane 32. The control plane has one or more CPUs 34 and generally run control processes such as routing processes, management processes, etc. The control plane programs the data plane to instruct the data plane how to forward data on the network.

The data plane 32 may be constructed using many different architectures and the example shown in FIG. 8 is only one example of one such architecture. In the example shown in FIG. 8, the data plane includes a plurality of line cards 36 each of which implements multiple physical ports which connect to links in the network. The line cards in this embodiment are interconnected by a switch fabric 40, although in other embodiments the line cards may be directly interconnected and perform switching functions in a distributed manner.

Figure 9:
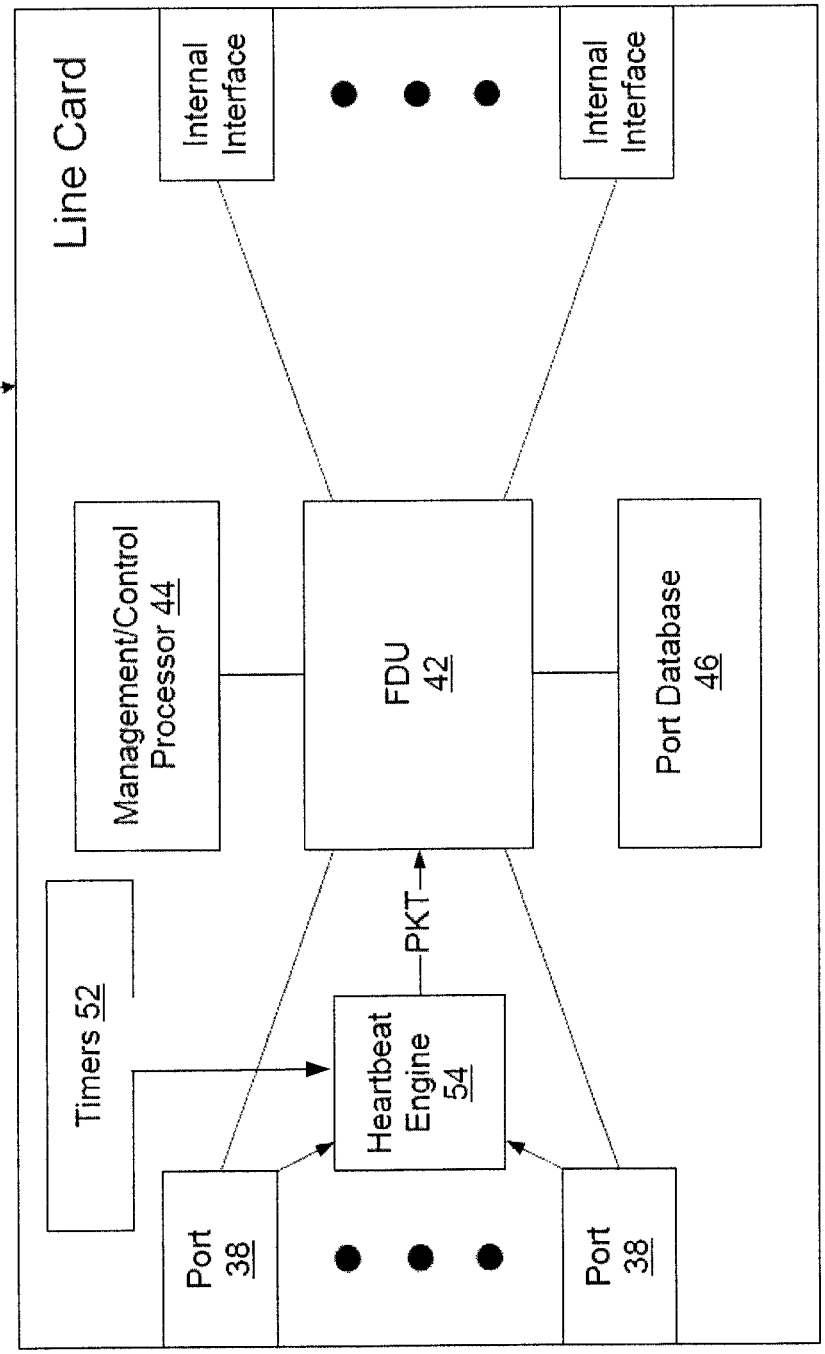
FIG. 9 is a functional block diagram of an example line card that may be used in a network element such as the network element of FIG. 8.

As shown in FIG. 9, each line card 36 includes a plurality of ports 38 which physically connect to the links on the network. The line card also includes one or more functional units 42 that process packets received from the attached ports. As used herein, the functional unit that processes packets from attached ports in both ingress and egress directions, and makes forwarding decisions, is referred to as a Forwarding Datapath Unit or FDU 42. The line card may also include a Management/Control Processor (MCP) 44 that interacts with the control plane to enable the control plane to program instructions into the FDU 42 and optionally other components on the line card so that the FDU 42 will handle data appropriately on the network. The MCP 44 also periodically checks the status of the FDU 42 and other components of the line card to detect when a failure occurs.

Figure 10:
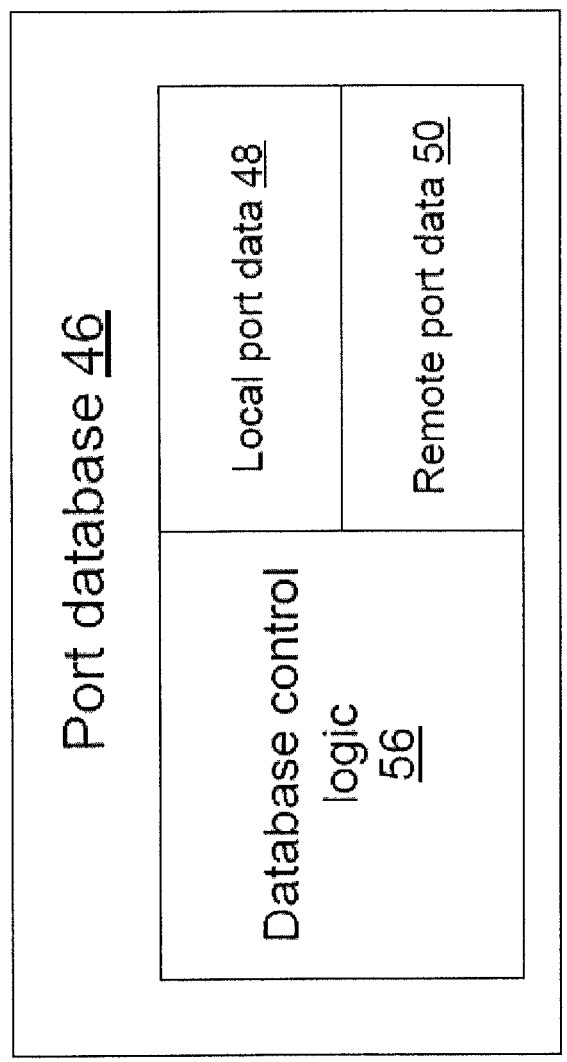
FIG. 10 is a functional block diagram of an example port database that may be used in a line card such as the line card of FIG. 9.

Referring now to FIG. 10, each FDU 42 maintains a port state database 46. This port state database 46 maintains the physical link states and connection states for its local as well as all remote ports. The port state database 46 includes two tables—a local port data table 48 and a remote port data table 50. The local port data table 48 maintains the port states belonging to the local node, and the remote port data table 50 maintains the port states belonging to the remote nodes within the cluster. In the case of MLT groups, the FDU keeps the MLT port members on the local node in the local table, and the port members on all other remote nodes in the remote table.

When the FDU receives a packet, it is required to find a port within the MLT (or SMLT) that is UP to forward the packet on toward its destination on the network. A port is either in an UP state or in a DOWN state. As noted above, where all the ports on the MLT are local, the FDU will need to determine which of the local ports is in the UP state so that it does not attempt to forward the packet over a port that is DOWN. Likewise, where the ports associated with the MLT are not all local (e.g. SMLT), the FDU will need to select a port on a separate physical network element that is associated with the SMLT and has an UP state.

According to an embodiment, each FDU maintains a port state database 46 that it uses to maintain the state of each port within the cluster. The database maintains the physical link states and connection states for its local as well as all remote ports. The database includes two tables—namely a local table 48 and remote table 50. The local table maintains the port states belonging to all FDUs on the local node, and the remote table maintains the port states of all ports on all remote nodes within the cluster. In the case of MLT groups, the FDU keeps the state of the MLT port members that are on the local node within the local table, and keeps the state of the MLT port members that are on all other remote nodes in the remote table. The local table also maintains the state of all IST ports. When a packet is received, the FDU will use the port state database to determine a port for the packet that is UP and forward the packet to that port to be output on the network.

Since the port state database 46 is used by the FDU 42 to make forwarding decisions, it is important to keep the port state table updated, so that it contains current information about the state of each of the ports. Since each line card has one or more FDU, each FDU (in each line card) is required to synchronize with the FDUs in all other line cards within the local network element as well as with all other FDUs in other network elements within the cluster.

In one embodiment, each line card maintains heartbeat timers. Each time a particular one of the heartbeat timers expires, a heartbeat engine 54 generates a heartbeat packet and sends the heartbeat packet to the local FDU 42 on that line card. The heartbeat packet carries the local physical link status of all ports on the line card to inform the local FDU of the state of the ports on that line card. The packet indicates the Global Port ID (GPID) and a network element ID. The FDU uses this state to update its local port state database. The FDU will also forward the packet to all of the other FDUs within the local node, as well as to all other FDUs on other nodes within the cluster. Each FDU uses the port state carried by the packet to update its port state database.

In addition to maintaining a timer associated with collecting/reporting its own port state information, each line card/FDU will also maintain a set of timers associated with all other FDUs within the local node and all other FDUs on other nodes within the cluster. Each FDU expects to receive periodic heartbeat packets from every other local and remote FDU. Thus, a local reception timer is maintained per FDU (for each FDU on the local network element as well as for each FDU on each remote network element within the cluster). A FDU failure (local or remote) is detected if the corresponding reception timer expires. Where a heartbeat packet is not received before expiration of the reception timer, each port associated with the FDU will be set to DOWN so that packets are not sent to ports associated with that FDU until it is restored.

The heartbeat packets allow the FDUs to convey state information to each other and allow each FDU to know the state of all ports in the dataplane. As described below, this allows the dataplane to automatically adjust to port failures so that data may be redirected to ports that are UP and away from ports that are Down. All this happens without intervention from the control plane and, hence, the control plane is not notified of a failure of a particular port/line card. To enable the control plane to learn of dataplane failures, the management/control processor 44 periodically injects and extracts heartbeat packets into and out of its local FDU 42. Each injected heartbeat packet completely loops through the target FDU and associated ports and then is extracted back to the processor. The management heartbeat packet traverses all functional blocks in both ingress and egress datapaths. Each time the control processor injects a management heartbeat packet of this nature, it kicks off its corresponding reception timer. The control processor detects a failure of the line card if the reception timer expires. The processor uses this information to set a system alarm which will be conveyed to the control plane 30. The control plane may thus learn about a data plane failure. However, since the dataplane has a self-healing mechanism to accommodate port failures and redirect traffic accordingly, the control plane is not required to be involved in redirecting traffic and, hence, notification of the control plane of the failure is not critical to restoration of traffic through the network element.

Heartbeat packets are also used by each FDU to determine the state of its ports. In one embodiment, each FDU maintains a pair of timers per attached port that is configured in a logical/virtual connection. One of the timers is used to generate heartbeat packets to be sent over the connection. The other timer (reception timer) is used to detect connection failure. This timer expires if the heartbeat packet from the other endpoint of the connection is not received in time. The FDU updates its port state table with the arrival of heartbeat packets and reception timer expirations.

Each FDU on each line card maintains its own port state table 46. This table maintains the physical link states and connection states for its local ports as well as all remote ports of all FDUs in the cluster. The FDU uses the received heartbeat packets and timer expiration messages (due to connection time-out or remote FDU failure) to update the table. The table is partitioned into two segments: port states belonging to local node and port states belonging to the remote nodes. The port state table also maintains MLT and SMLT group information. The port state table is used by the forwarding logic to perform fast reroute as explained in greater detail below.

Figure 11:
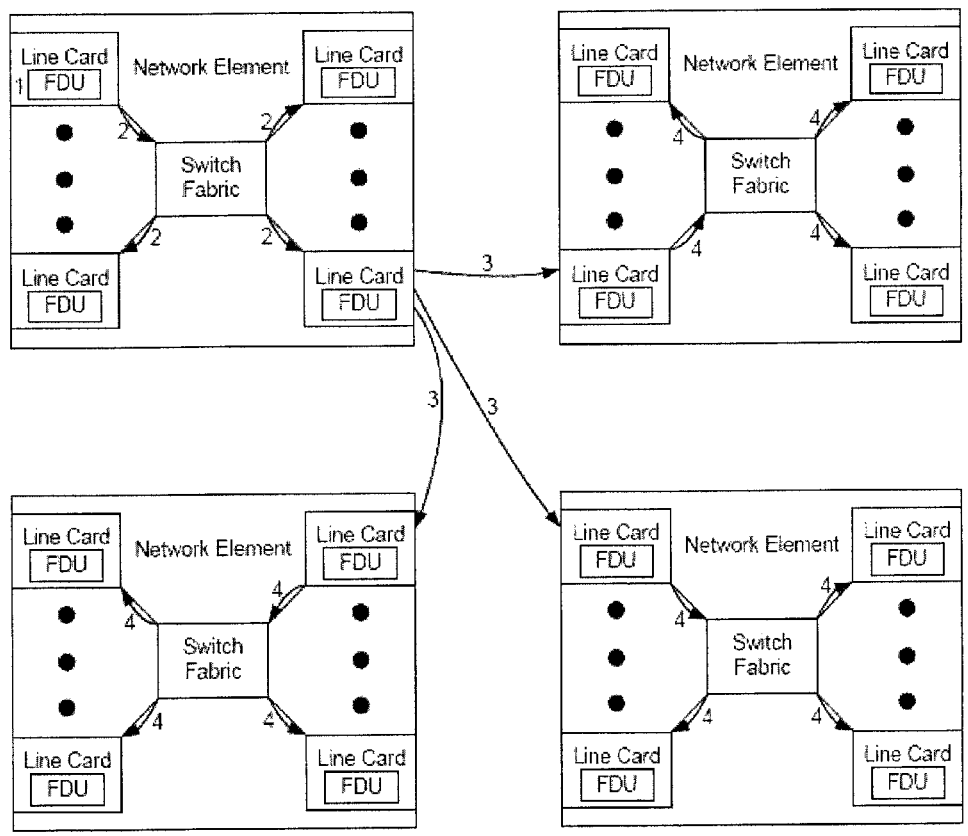
FIG. 11 is a functional block diagram of an example cluster of network elements showing the flow of port state information between the components of the datapath within the node cluster.

FIG. 11 shows dissemination of the port state packet within a cluster of four nodes, in which the dark arrows represents the flow of the port state packet to all FDUs in the cluster. As shown in this figure, packet 1 will be generated containing the state of each port associated with a particular FDU. This packet is shown with reference numeral 1 in the top left line card of the top left network element. This packet will be passed to the FDU so that the FDU can update its port state database to reflect the current status of its ports. The packet will then be passed to each of the other FDUs within the local node (arrows 2). In one embodiment this may be implemented by causing the packet to be broadcast by the switch fabric to all other FDUs within the local node. The packet will also be forwarded to other nodes within the cluster (arrows 3) so that the state of the port may be distributed (arrows 4) to each FDU associated with each node of the cluster. Whenever a FDU receives a packet containing port state information, it will use the information to update its own port state database. This enables the port state database of all FDUs in the cluster to be synchronized.

There may be several network elements within a cluster, multiple FDUs within a network element, and multiple ports supported by each FDU. To enable each node to keep track of which FDUs have provided state packets, and to correlate particular port state packets with particular FDUs, a numbering scheme may be implemented. Preferably the numbering scheme is implemented to be cluster wide unique so that each FDU within the cluster may be uniquely identified. In one embodiment, the port state packet carries information about each of its ports. The packet will specify the source node ID and the Global Port ID (GPID). The Global Port ID is the globally unique identifier (globally unique within a node) that enables the port to be uniquely identified within the port database.

The previous messages described how the FDUs exchanged messages to enable port state to be synchronized between ports in the datapath. In operation, this port state information will enable the FDUs to select an available port for a particular data packet with confidence that the selected port is UP. As ports go Down, the FDUs in the cluster will stop selecting those ports and will instead select alternate ports within the MLT/SMLT associated with the down port to be used to handle the packet. Accordingly, the datapath is able to automatically accommodate port failures, line card failures, etc., to re-route packets to available alternate ports without involvement of the control plane. Hence, rerouting of packets may be done quickly within a network element and between clusters of network elements in under 10 ms.

Figure 12:
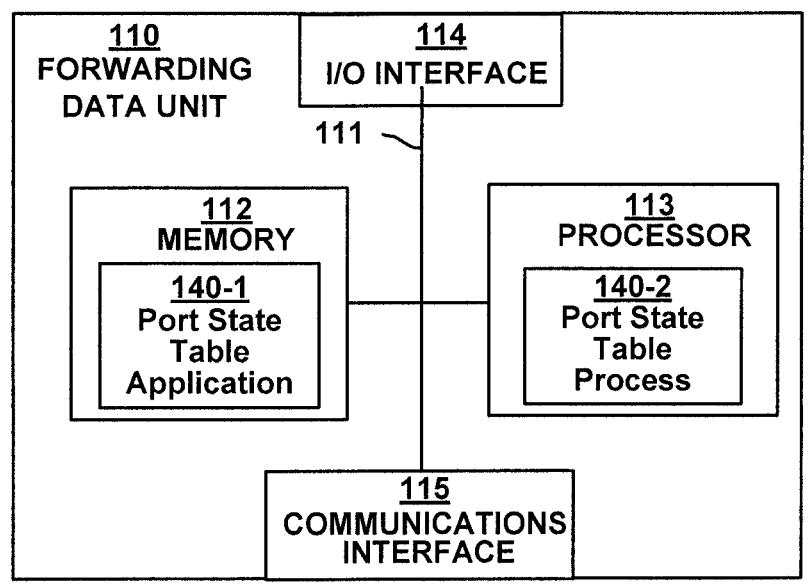
FIG. 12 illustrates an example computer system architecture for a network element that maintains a port state table in accordance with embodiments of the invention.

FIG. 12 is a block diagram illustrating example architecture of a Forwarding Data Unit (FDU) 110 that executes, runs, interprets, operates or otherwise performs a port state table application 140-1 and port state table process 140-2 suitable for use in explaining example configurations disclosed herein. As shown in this example, the FDU 110 includes an interconnection mechanism 111 such as a data bus or other circuitry that couples a memory system 112, a processor 113, an input/output interface 114, and a communications interface 115. The communications interface 115 enables the FDU 110 to communicate with other devices (i.e., other computers) on a network (not shown).

The memory system 112 is any type of computer readable medium, and in this example, is encoded with a port state table application 140-1 as explained herein. The port state table application 140-1 may be embodied as software code such as data and/or logic instructions (e.g., code stored in the memory or on another computer readable medium such as a removable disk) that supports processing functionality according to different embodiments described herein. During operation of the FDU 110, the processor 113 accesses the memory system 112 via the interconnect 111 in order to launch, run, execute, interpret or otherwise perform the logic instructions of a port state table application 140-1. Execution of a port state table application 140-1 in this manner produces processing functionality in the port state table process 140-2. In other words, the port state table process 140-2 represents one or more portions or runtime instances of a port state table application 140-1 (or the entire a port state table application 140-1) performing or executing within or upon the processor 113 in the FDU 110 at runtime.

It is noted that example configurations disclosed herein include the port state table application 140-1 itself (i.e., in the form of un-executed or non-performing logic instructions and/or data). The port state table application 140-1 may be stored on a computer readable medium (such as a floppy disk), hard disk, electronic, magnetic, optical, or other computer readable medium. A port state table application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a port state table application 140-1 in the processor 113 as the port state table process 140-2. Those skilled in the art will understand that the FDU 110 may include other processes and/or software and hardware components, such as an operating system not shown in this example.

During operation, processor 113 of FDU 110 accesses memory system 112 via the interconnect 111 in order to launch, run, execute, interpret or otherwise perform the logic instructions of the port state table application 140-1. Execution of port state table application 140-1 produces processing functionality in port state table process 140-2. In other words, the port state table process 140-2 represents one or more portions of the port state table application 140-1 (or the entire application) performing within or upon the processor 113 in the computer system 100.

It should be noted that, in addition to the port state table process 140-2, embodiments herein include the port state table application 140-1 itself (i.e., the un-executed or non-performing logic instructions and/or data). The port state table application 140-1 can be stored on a computer readable medium such as a floppy disk, hard disk, or optical medium. The port state table application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of port state table application 140-1 in processor 113 as the port state table process 140-2. Those skilled in the art will understand that the FDU 110 can include other processes and/or software and hardware components, such as an operating system that controls allocation and use of hardware resources associated with the FDU 110.

Figure 13:
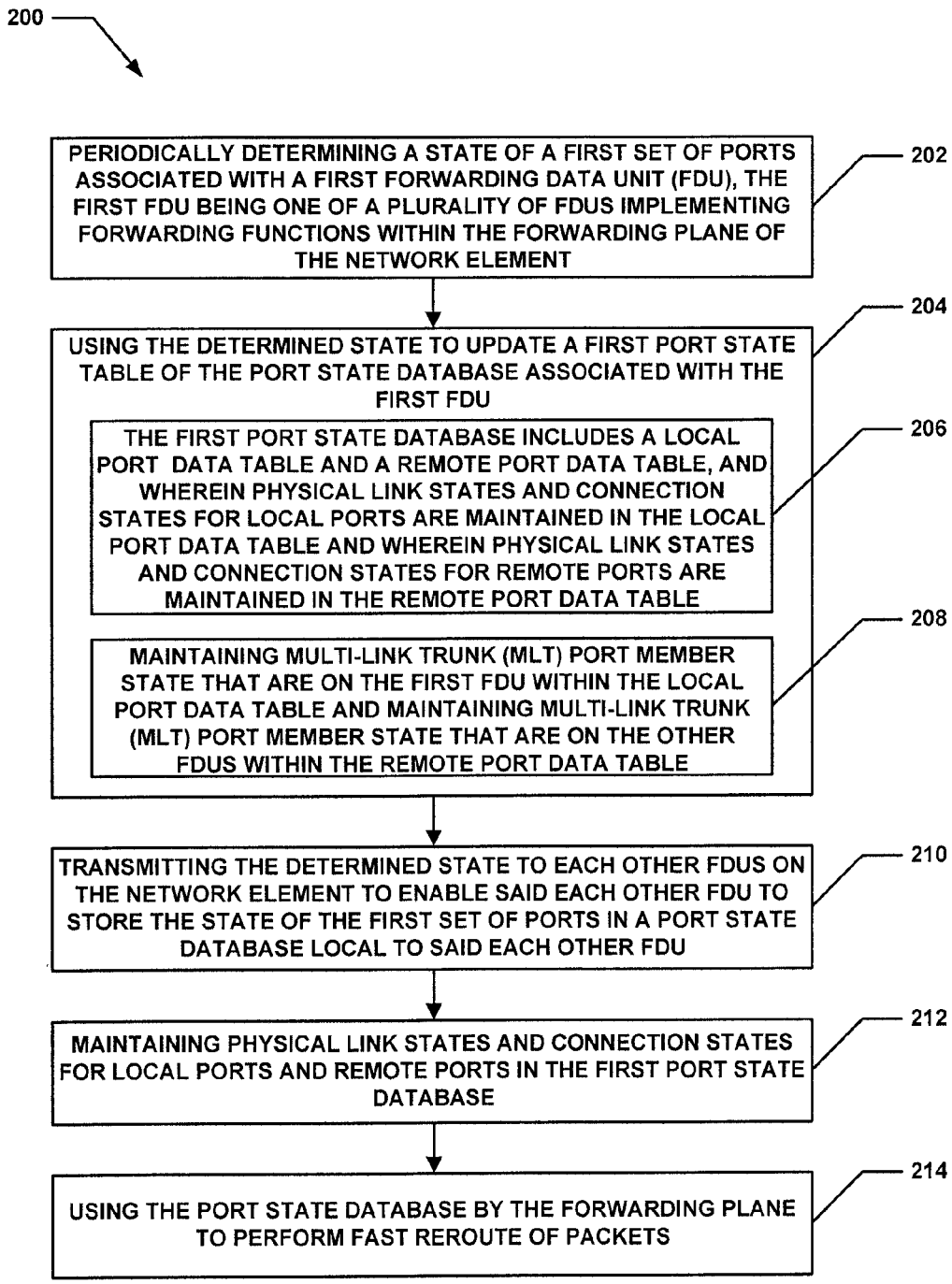
FIG. 13 comprises a flow diagram of a method for maintaining port state tables in accordance with embodiments of the invention.
Figure 14:
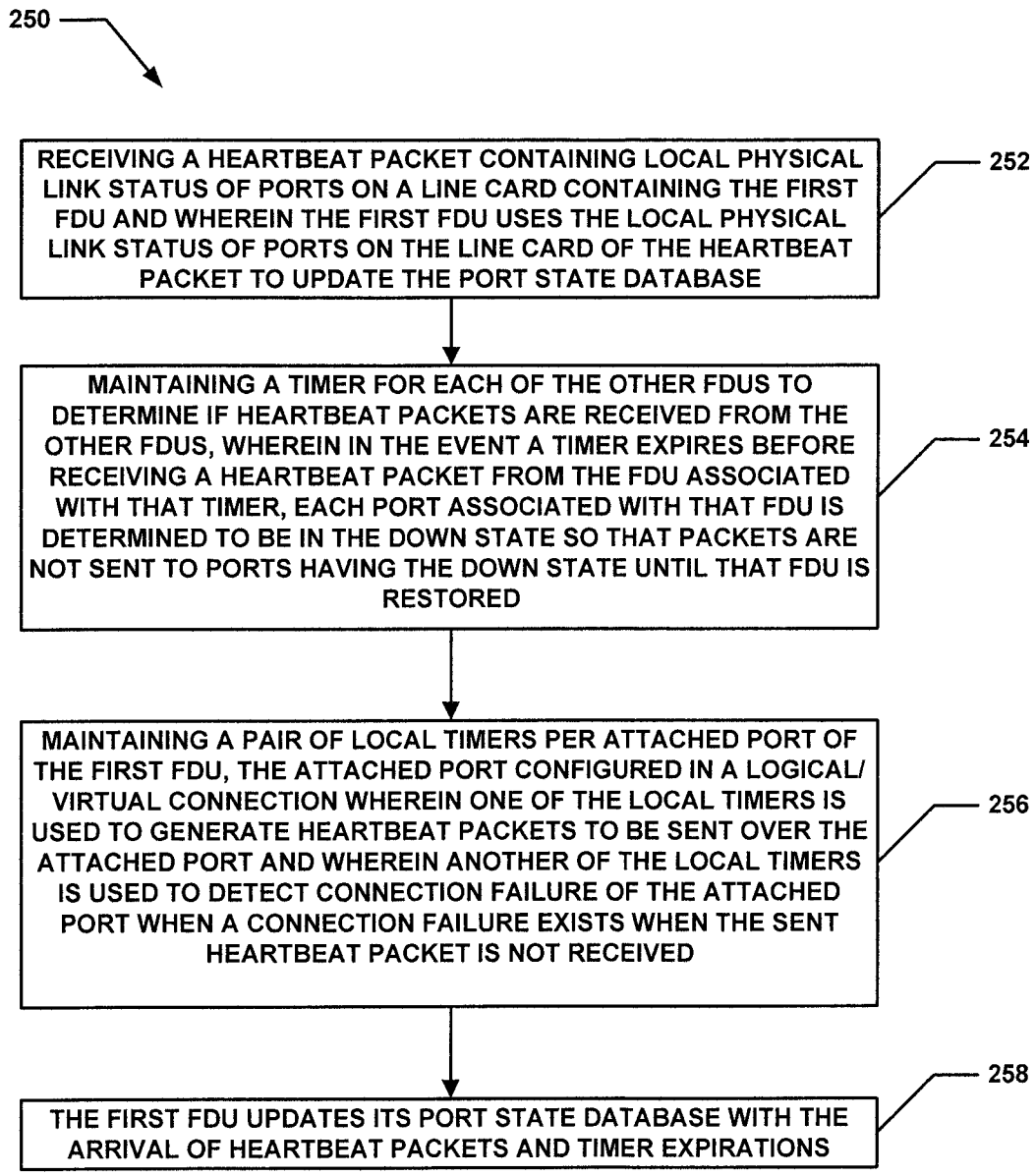
FIG. 14 comprises a flow diagram of a method for updating a port state table within a network element in accordance with embodiments of the invention.

Flow diagrams of the presently disclosed methods are depicted in FIGS. 13 and 14. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 13, a particular embodiment of a method 200 of maintaining a port state database in a forwarding plane of a network element is shown. Method 200 begins with processing block 202 which discloses periodically determining a state of a first set of ports associated with a first Forwarding Data Unit (FDU), the first FDU being one of a plurality of FDUs implementing forwarding functions within the forwarding plane of the network element.

Processing block 204 states using the determined state to update a first port state table of the port state database associated with the first FDU. As shown in processing block 206, the first port state database includes a local port data table and a remote port data table, and wherein physical link states and connection states for local ports are maintained in the local port data table and wherein physical link states and connection states for remote ports are maintained in the remote port data table. As further shown in processing block 208, the process includes maintaining Multi-Link Trunk (MLT) port member state that are on the first FDU within the local port data table and maintaining Multi-Link Trunk (MLT) port member state that are on the other FDUs within the remote port data table.

Processing continues with processing block 210 which recites transmitting the determined state to each other FDU on the network element to enable each of the other FDUs to store the state of the first set of ports in a port state database local to each of the other FDUs. Processing block 212 discloses maintaining physical link states and connection states for local ports and remote ports in the first port state database. Processing block 214 states using the port state database by the forwarding plane to perform fast reroute of packets.

Referring now to FIG. 14 a particular embodiment of a method 250 for updating a port state table is shown. Method 250 begins with processing block 252 which discloses receiving a heartbeat packet containing local physical link status of ports on a line card containing the first FDU and wherein the first FDU uses the local physical link status of ports on the line card of the heartbeat packet to update the port state database.

Processing block 254 states maintaining a timer for each of the other FDUs to determine if heartbeat packets are received from the other FDUs, wherein in the event a timer expires before receiving a heartbeat packet from the FDU associated with that timer, each port associated with that FDU is determined to be in the DOWN state so that packets are not sent to ports having the DOWN state until that FDU is restored.

Processing block 256 recites maintaining a pair of local timers per attached port of the first FDU, the attached port configured in a logical/virtual connection wherein one of the local timers is used to generate heartbeat packets to be sent over the attached port and wherein another of the local timers is used to detect connection failure of the attached port when a connection failure exists when the sent heartbeat packet is not received. Processing block 258 discloses the first FDU updates its port state database with the arrival of heartbeat packets and timer expirations.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of maintaining a port state database in a forwarding plane of a network element, the method comprising the steps of:
periodically determining, by the network element, a state of a first set of ports associated with a first Forwarding Data Unit (FDU), the first FDU being one of a plurality of FDUs implementing forwarding functions within the forwarding plane of the network element;
using, by the network element, the determined state to update a first port state table of the port state database associated with the first FDU; and
transmitting the determined state to each other FDUs on the network element to enable each of said other FDUs to store the state of the first set of ports in a port state database local to each of said other FDUs.

2. The method of claim 1 further comprising maintaining, by the network element, physical link states and connection states for local ports and remote ports in said first port state database.

3. The method of claim 2 wherein said first port state database includes a local port data table and a remote port data table, and wherein physical link states and connection states for local ports are maintained in said local port data table and wherein physical link states and connection states for remote ports are maintained in said remote port data table.

4. The method of claim 3 further comprising maintaining, by the network element, Multi-Link Trunk (MLT) port member state that are on said first FDU within said local port data table and maintaining Multi-Link Trunk (MLT) port member state that are on said other FDUs within said remote port data table.

5. The method of claim 1 further comprising receiving a heartbeat packet containing local physical link status of ports on a line card containing said first FDU and wherein said first FDU uses the local physical link status of ports on the line card of said heartbeat packet to update said port state database.

6. The method of claim 5 further comprising maintaining a timer for each of said other FDUs to determine if heartbeat packets are received from said other FDUs, wherein in the event a timer expires before receiving a heartbeat packet from the FDU associated with that timer, each port associated with that FDU is determined to be in the DOWN state so that packets are not sent to ports having the DOWN state until that FDU is restored.

7. The method of claim 6 further comprising maintaining a pair of local timers per attached port of said first FDU, the attached port configured in a logical/virtual connection wherein one of said local timers is used to generate heartbeat packets to be sent over said attached port and wherein another of said local timers is used to detect connection failure of the attached port when a connection failure exists when the sent heartbeat packet is not received.

8. The method of claim 7 wherein said first FDU updates its port state database with the arrival of heartbeat packets and timer expirations.

9. The method of claim 1 further comprising using, by the network element, the port state database by said forwarding plane to perform fast reroute of packets.

10. A network element comprising:
a memory;
a processor;
a communications interface;
an interconnection mechanism coupling the memory, the processor and the communications interface; and
wherein the memory is encoded with an application maintaining a port state database, that when performed on the processor, provides a process for processing information, the process causing the network element to perform the operations of:
periodically determining a state of a first set of ports associated with a first Forwarding Data Unit (FDU), the first FDU being one of a plurality of FDUs implementing forwarding functions within the forwarding plane of the network element;
using the determined state to update a first port state table of the port state database associated with the first FDU; and
transmitting the determined state to each other FDUs on the network element to enable each of said other FDUs to store the state of the first set of ports in a port state database local to each of said other FDUs.

11. The network element of claim 10 further comprising performing the operation of maintaining physical link states and connection states for local ports and remote ports in said first port state database.

12. The network element of claim 11 wherein said first port state database includes a local port data table and a remote port data table, and wherein physical link states and connection states for local ports are maintained in said local port data table and wherein physical link states and connection states for remote ports are maintained in said remote port data table.

13. The network element of claim 12 further comprising performing the operation of maintaining Multi-Link Trunk (MLT) port member state that are on said first FDU within said local port data table and maintaining Multi-Link Trunk (MLT) port member state that are on said other FDUs within said remote port data table.

14. The network element of claim 10 further comprising performing the operation of receiving a heartbeat packet containing local physical link status of ports on a line card containing said first FDU and wherein said first FDU uses the local physical link status of ports on the line card of said heartbeat packet to update said port state database.

15. The network element of claim 14 further comprising performing the operation of maintaining a timer for each of said other FDUs to determine if heartbeat packets are received from said other FDUs, wherein in the event a timer expires before receiving a heartbeat packet from the FDU associated with that timer, each port associated with that FDU is determined to be in the DOWN state so that packets are not sent to ports having the DOWN state until that FDU is restored.

16. The network element of claim 15 further comprising performing the operation of maintaining a pair of local timers per attached port of said first FDU, the attached port configured in a logical/virtual connection wherein one of said local timers is used to generate heartbeat packets to be sent over said attached port and wherein another of said local timers is used to detect connection failure of the attached port when a connection failure exists when the sent heartbeat packet is not received.

17. The network element of claim 16 wherein said first FDU updates its port state database with the arrival of heartbeat packets and timer expirations.

18. The network element of claim 10 further comprising performing the operation of using the port state database by said forwarding plane to perform fast reroute of packets.

19. A non-transitory computer readable storage medium having computer readable code thereon for maintaining a port state database, the medium including instructions in which a computer system performs operations comprising:
   periodically determining a state of a first set of ports associated with a first Forwarding Data Unit (FDU), the first FDU being one of a plurality of FDUs implementing forwarding functions within the forwarding plane of the network element;
   using the determined state to update a first port state table of the port state database associated with the first FDU; and
   transmitting the determined state to each other FDUs on the network element to enable each of said other FDUs to store the state of the first set of ports in a port state database local to each of said other FDUs.

20. The non-transitory computer readable storage medium of claim 19 further comprising instructions for performing the operation of maintaining physical link states and connection states for local ports and remote ports in said first port state database, wherein said first port state database includes a local port data table and a remote port data table, and wherein physical link states and connection states for local ports are maintained in said local port data table and wherein physical link states and connection states for remote ports are maintained in said remote port data table, and using the port state database by said forwarding plane to perform fast reroute of packets.

* * * * *